United States Patent Office 3,290,327
Patented Dec. 6, 1966

3,290,327
1-PHENYL-3-BUTYL-4-METHYL-TRIAZOLONE-(5)
Giuseppe Palazzo, Rome, Italy, assignor to Aziende Chimiche Riunite Angelini Francesco, a corporation of Italy
No Drawing. Filed Oct. 5, 1964, Ser. No. 401,680
Claims priority, application Italy, Oct. 15, 1963, 21,279/63
1 Claim. (Cl. 260—308)

This invention relates to 1-phenyl-3-butyl-4-methyl-triazolone-(5) having the Formula I:

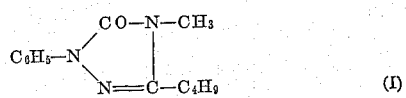

According to the invention, 1-phenyl-3-butyl-4-methyl-triazolone-(5) can be prepared by condensing valeranyl ethyl urethane with phenylhydrazine, and subsequently methylating the product with any usual methylating agent. The method of the invention may be represented by the following equation:

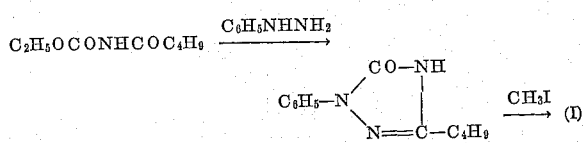

The valeranyl ethyl urethane, which is a new compound, may in turn be obtained from valeric acid chloride and ethyl urethane. This reaction may be carried out in the absence of solvents, as well as in the presence of a solvent, preferably a non-polar solvent. The condensation of valeranyl ethyl urethane and phenyl hydrazine may in turn be carried out in the presence of solvents, preferably inert solvents. A preferred solvent according to the invention is toluene, but other nonpolar solvents, and even water, may also be used. The reaction is suitably carried out in the presence of a dehydrating agent, preferably phosphoric anhydride; however, the presence of such an agent is not essential in obtaining the desired product.

The methylation of 1-phenyl-3-butyl-triazolone-(5) is carried out with methyl sulfate or methyl iodide, in the presence of acid removers. The methylation is suitably carried out on an alkali metal salt of 1-phenyl-3-butyl-triazole-(5).

The product of the invention possesses interesting pharmacological properties, and particularly a quite remarkable antipyretic activity, as well as an anti-inflammatory and analgesic activity. The investigation of the antipyretic activity was carried out on rabbits and rats which had been made hyperpyretic by the intramuscular injection of a non-specific, pyretogenous material (Smith and Hamburger, 1938). 1-phenyl-3-butyl-4-methyl-triazolone-(5) appeared twice as active as acetyl salicylic acid, and 1.5 times as active as aminopyrine, whereas it did not alter the temperature of normal animals. The anti-inflammatory activity was studied on the eczema induced in the hind leg of rats by the local injection of irritating substances, and on the foreign body-caused granuloma in rats (Mayer et al., 1957). In these rats, the tested compound showed an activity comparable to or higher than that of aminopyrine. Finally, the analgesic activity was studied by the Randall and Selitto test, employing the pain response caused by an inflamed tissue. When subjected to this test, 1-phenyl-3-butyl-4-methyl-triazolone-(5) showed the same activity as acetylsalicylic acid.

The very low toxicity of the product is particularly interesting. In the acute toxicity test, it was practically impossible to reach a dose capable of killing the animals by the oral route. In the chronic toxicity tests, it was shown that the rats could tolerate a daily, oral dose of 500 mg./kg. of the product for two months, without showing any toxic symptoms involving blood, tissues or organs. The method of the invention is illustrated by the following example, which is not intended as limitative thereof.

*Example*

Equimolecular amounts of valeric acid chloride and ethyl urethane are heated at 100° C. for 3 hours. The reaction mass solidifies upon cooling, and is recrystallized first from ligroin and then from aqueous alcohol. An analytical sample of valeranyl ethyl urethane melts at 63–64° C.

*Analysis.*—Calculated for $C_8H_{15}NO_3$: N, 8.09%. Found: N, 7.95%.

24 g. of the so obtained crude valeranyl ethyl urethane, 15 g. of phenylhydrazine and 3.8 g. of phosphoric anhydride are heated in 200 cc. of toluene for 3 hours. The toluene solution is decanted from the solid residue remaining on the bottom of the flask, filtered, and extracted with 2 N sodium hydroxide. Upon acidifying the alkaline solution, 1-phenyl-3-butyl-1,2,4-triazol-5-one, M.P. 118–121° C., is precipitated. An analytical sample thereof melts at 121° C.

*Analysis.*—Calculated for $C_{12}H_{15}N_3O$: N, 19.34%. Found: N, 19.61%.

11 g. of this compound are dissolved into a sodium methylate solution obtained from 1.2 g. of sodium and 100 cc. of methanol. 6.5 g. of methyl iodide are added, and the mixture is refluxed for 2 hours. The solvent is then removed, and the residue is taken up with water. The precipitate is washed with diluted sodium hydroxide and with water, to give 10 g. of a product, M.P. 81–83° C. Upon recrystallization from hexane, the 1-phenyl-3-butyl-4-methyl-triazolone-(5) melts at 83–84° C.

*Analysis.*—Calculated for $C_{13}H_{17}N_3O$: C, 67.50%; H, 7.41%; N, 18.17%. Found: C, 67.48%; H, 7.53%; N, 17.98%.

What I claim is:
A compound of the formula:

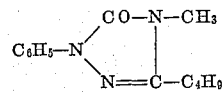

References Cited by the Examiner

FOREIGN PATENTS 539,404    9/1941    Great Britain.
1,126,882    4/1962    Germany.
1,147,591    4/1963    Germany.

OTHER REFERENCES

Alexeyeff, Organic Syntheses (New York, 1906), pages 112–114.

Beilstein, Handbuch der Organischen Chemie, vol. 26 (Berlin, 1937), pages 146–150.

Groggins, Unit Processes in Organic Synthesis (New York, 1952), pages 610–611.

ALEX MAZEL, *Primary Examiner.*

NICHOLAS S. RIZZO, HENRY R. JILES, ALTON D. ROLLINS, *Assistant Examiners.*